(12) United States Patent
Yu

(10) Patent No.: US 7,298,227 B2
(45) Date of Patent: Nov. 20, 2007

(54) LOCAL OSCILLATOR FOR MULTI-BAND WIRELESS COMMUNICATION

(75) Inventor: Jin-Hyuck Yu, Hwaseong-Si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 157 days.

(21) Appl. No.: 11/145,252

(22) Filed: Jun. 3, 2005

(65) Prior Publication Data

US 2005/0282512 A1    Dec. 22, 2005

(30) Foreign Application Priority Data

Jun. 22, 2004    (KR) .................. 10-2004-0046527

(51) Int. Cl.
*H04B 1/06* (2006.01)
*H03L 7/22* (2006.01)

(52) U.S. Cl. .................. 331/179; 331/25; 455/260

(58) Field of Classification Search .......... 331/14, 331/25, 179; 455/260
See application file for complete search history.

(56) References Cited

U.S. PATENT DOCUMENTS 5,684,434 A * 11/1997 Mann et al. .................. 331/16
6,072,996 A    6/2000 Smith ...................... 455/189.1
6,388,478 B1 * 5/2002 Mann ......................... 327/113
6,608,530 B1 * 8/2003 Green et al. .................. 331/25

OTHER PUBLICATIONS

European Patent Publication No. EP1061661 to Salminen, having Publication date of Dec. 20, 2000.
Japanese Patent Publication No. 11-112333 to Akita, having Publication date of Apr. 23, 1999 (w/ English Abstract page).
Japanese Patent Publication No. 2000-124829 to Hayashibara, having Publication date of Apr. 28, 2000 (w/ English Abstract page).
Korean Patent Publication No. 1020020069948 to Ko, having Publication date of Sep. 5, 2002 (w/ English Abstract page).

* cited by examiner

*Primary Examiner*—Robert Pascal
*Assistant Examiner*—James Goodley
(74) *Attorney, Agent, or Firm*—Monica H. Choi

(57) ABSTRACT

For use in a multi-band wireless communication system, a local oscillator includes a voltage-controlled oscillator that generates an oscillating signal in response to a control signal. A local oscillating signal generator includes buffers and frequency dividers for generating from the oscillating signal a plurality of frequency signals having different frequencies. A switching circuit selects one of the frequency signals, and a phase locked loop generates the control signal from the selected frequency signal.

20 Claims, 6 Drawing Sheets

LOCAL OSCILLATOR FOR MULTI-BAND WIRELESS COMMUNICATION

BACKGROUND OF THE INVENTION

This application claims priority to Korean Patent Application No. 2004-46527 filed on Jun. 22, 2004 in the Korean Intellectual Property Office (KIPO), the entire contents of which are incorporated herein by reference.

1. Field of the Invention

The present invention relates generally to wireless communication systems, and more particularly to a local oscillator for a multi-band wireless communication system.

2. Description of the Related Art

A wireless communication system uses various frequency bands. For example, a 800 MHz frequency band is used for cellular CDMA (Code Division Multiple Access), a 1900 MHz frequency band is used for PCS (Personal Communication Service), and a 1500 MHz frequency band is used for GPS (Global Positioning System).

Generally, a wireless communication terminal uses only one frequency band. For example, a CDMA wireless communication terminal uses about 800 MHz frequency band but not the 1900 MHz PCS frequency band nor the 1500 MHz GPS frequency band.

A multi-band communication system uses two or more frequency bands. For example, a wireless communication receiver is capable of receiving CDMA signals, PCS signals, and GPS signals. The prior art multi-band communication system uses multiple voltage-controlled oscillators for various frequency bands. Therefore, the prior art multi-band communication system has large chip size, high power consumption, and high cost.

A 0-IF (Zero-Intermediate Frequency) communication system does not use an IF (Intermediate Frequency). The 0-IF system is also called a Direct Conversion system. The 0-IF system is opposite to a Super Heterodyne system that uses IF. The 0-IF system directly converts a carrier signal to a baseband signal. In addition, the 0-IF system directly converts a baseband signal to a carrier signal.

The 0-IF system may reduce the number of SAW Filters (Surface Acoustic Wave Filters) and mixers so that the 0-IF system may reduce production cost and device size. The number of wireless communication systems to which the 0-IF system is applied has increased recently.

When a LO (Local Oscillating) signal has almost the same frequency as the frequency of the RF (Radio Frequency) signal, the 0-IF system performs adversely with signal leakage, DC offset, and I/O mismatch. Therefore, the 0-IF system generates an oscillating signal that has a frequency different from the frequency of the RF signal.

For example, a 0-IF multi-band wireless communication system generates oscillating signals that have frequencies different from the RF signal frequency using multiple voltage-controlled oscillators. The 0-IF system divides the frequencies of the oscillating signals to generate frequency divided oscillating signals. The 0-IF system mixes the oscillating signals and the divided oscillating signals with each other to generate the local-oscillating signals having wanted frequencies.

FIG. 1 is a block diagram of a conventional multi-band wireless communication system. Referring to FIG. 1, a PCS signal, a cellular signal, and a GPS signal are received at antennas 111, 112, and 113, respectively. Band pass filters 121, 122, and 123 filter the received PCS signal, cellular signal, and GPS signal, respectively, for filtering away unwanted frequency band signals. The filtered PCS signal, cellular signal, and GPS signal are amplified by LNAs (Low Noise Amplifiers) 131, 132, and 133, respectively. Band pass filters 141 and 142 filter the amplified PCS signal and cellular signal, respectively.

Then, mixers 151, 152, and 153 mix the thus processed PCS signal, cellular signal, and GPS signal with local-oscillating signals LO1, LO2, and LO3, respectively. The local oscillator 100 generates the local-oscillating signals LO1, LO2, and LO3. Therefore, a 0-IF PCS signal, a 0-IF cellular signal, and a 0-IF GPS signal are generated from the mixers 151, 152, and 153. Low pass filters 161, 162, and 163 filter the 0-IF PCS signal, the 0-IF cellular signal, and the 0-IF GPS signal, respectively. A modem 170 modulates or demodulates the filtered 0-IF PCS signal, 0-IF cellular signal, and 0-IF GPS signal.

The local oscillator in FIG. 1 includes two voltage-controlled oscillators 101 and 102, a complex LO generator 103, and a PLL (Phase Locked Loop) 104. The voltage-controlled oscillator 101 generates a first frequency band signal at about 1700 MHz. The voltage-controlled oscillator 102 generates a second frequency band signal at about 3150 MHz.

For the cellular signal, the LO generator 103 divides a frequency of the 1700 MHz frequency band signal by two to generate the local-oscillating signal LO2. The frequency range of the local-oscillating signal LO2 is in a range from about 832 MHz to about 894 MHz. For the GPS signal, the LO generator 103 divides a frequency of the 3150 MHz frequency band signal by two to generate the local-oscillating signal LO3. The frequency range of the local-oscillating signal LO3 is about 1575.42 MHz.

For the PCS signal, the LO generator 103 divides a frequency of the 1700 MHz frequency band signal by eight to generate a divided signal. The LO generator 103 mixes the 1700 MHz frequency band signal with the divided signal to generate the local-oscillating signal LO1. The frequency range of the local-oscillating signal LO1 is in a range from about 1840 MHz to about 1990 MHz.

The local oscillator 100 of the prior art uses two voltage-controlled oscillators 101 and 102 and at least one mixer within the LO generator 103 to generate the local-oscillating signals. Thus, the multi-band wireless communication system of FIG. 1 unfortunately has large chip size, high power consumption, high product price, and increased noise floor and spurious frequencies.

SUMMARY OF THE INVENTION

Accordingly, a local oscillator of the present invention uses one voltage-controlled oscillator to generate local-oscillating signals for a multi-band wireless communication system.

In a local oscillator according to an aspect of the present invention, a voltage-controlled oscillator generates an oscillating signal in response to a control signal. In addition, a local oscillating signal generator includes at least one buffer and at least one frequency divider for generating from the oscillating signal a plurality of frequency signals having different frequencies. The local oscillating signal generator also includes a switching circuit that selects one of the plurality of frequency signals. The local oscillator also includes a phase locked loop that generates the control signal from the selected frequency signal.

In one embodiment of the present invention, the local oscillating signal generator outputs a local-oscillating signal generated from the selected frequency signal. In that case, the local oscillating signal generator further includes another frequency divider coupled to an output of the switching circuit to generate the local-oscillating signal by frequency division of the selected frequency signal.

In another embodiment of the present invention, the local oscillating signal generator generates a respective local-oscillating signal from each of the plurality of frequency signals. In that case, the local oscillating signal generator further includes a respective frequency divider for receiving a corresponding one of the frequency signals to generate the respective local-oscillating signal.

In a further embodiment of the present invention, the frequency signal selected by the switching circuit depends on a tuned frequency range of the voltage-controlled oscillator.

Such a local oscillator is used to particular advantage within a multi-band wireless communication system comprising antennas for receiving multiple frequency band signals each having a respective frequency range. In that case, the local-oscillating signals from the local oscillator are used for mixing with the frequency band signals.

In this manner, the local oscillator uses just one voltage-controlled oscillator for reduced chip size, power consumption, product price, and noise.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2, 3, 4, 5, and 6 refer to elements having similar structure and/or function.

DETAILED DESCRIPTION OF THE INVENTION

Figure 1:
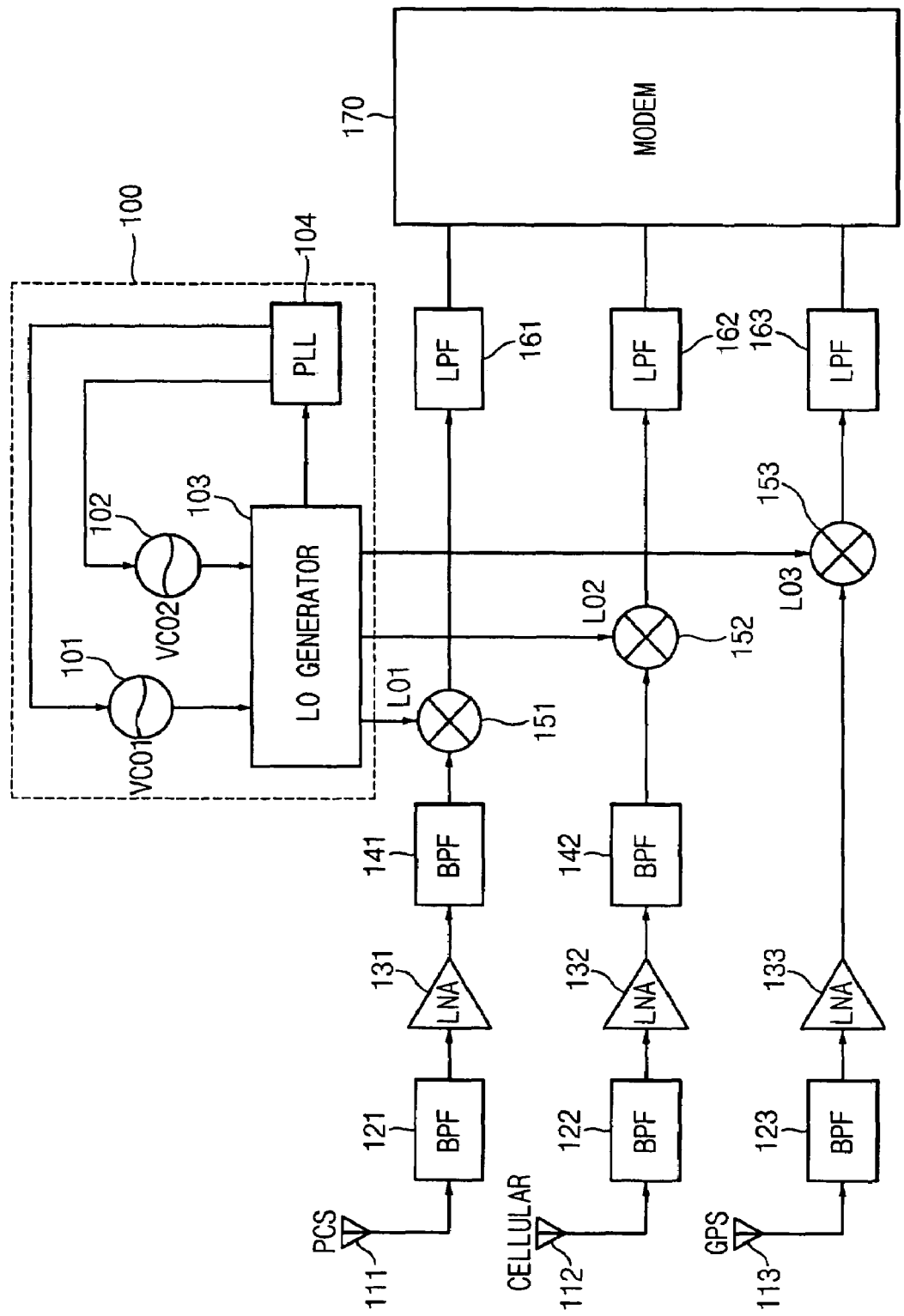
FIG. 1 is a block diagram of a multi-band wireless communication system of the prior art.
Figure 2:
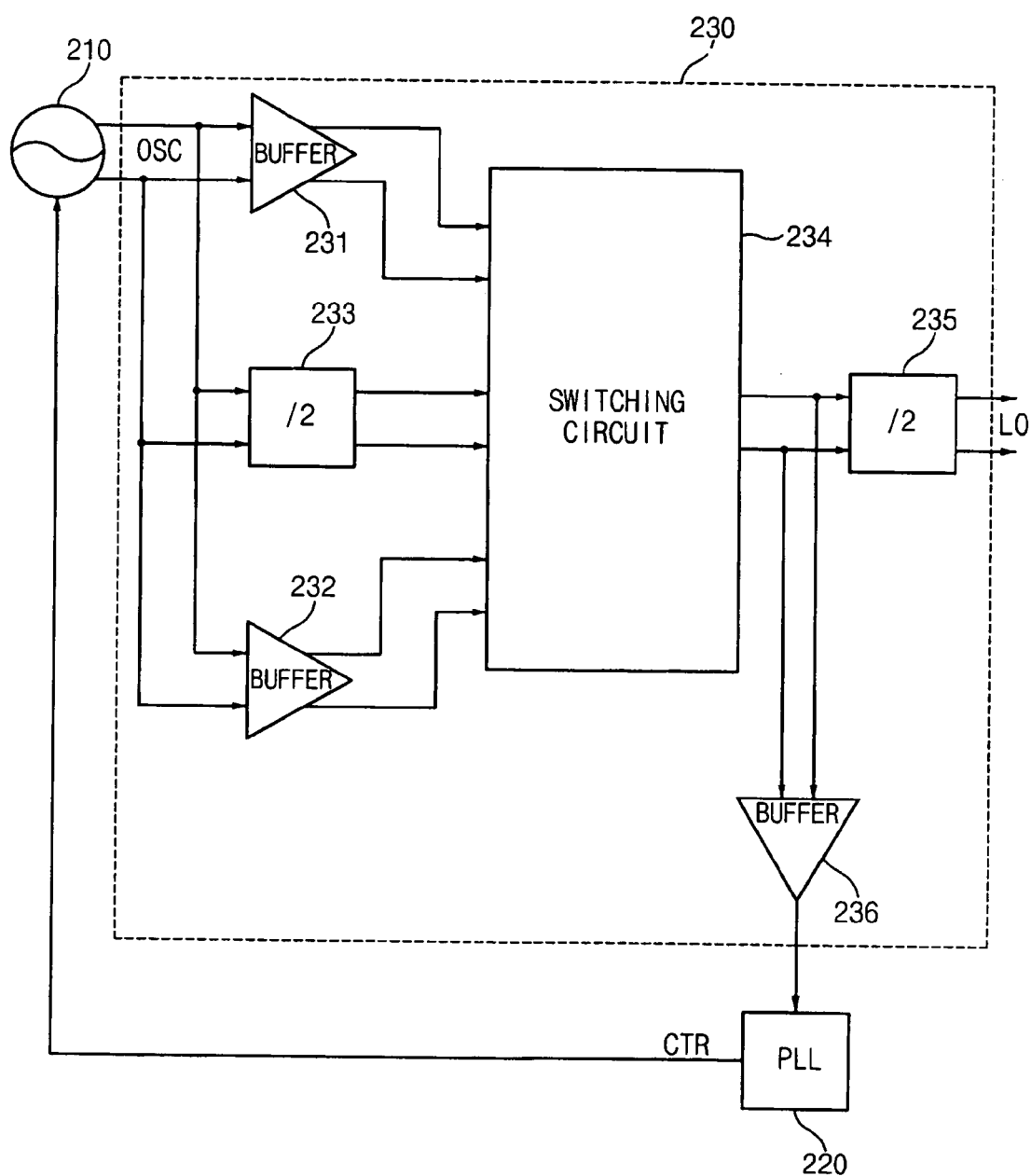
FIG. 2 is a block diagram of a local oscillator according to an embodiment of the present invention.

FIG. 2 is a block diagram of a local oscillator 200 according to an embodiment of the present invention. Referring to FIG. 2, the local oscillator 200 includes a voltage-controlled oscillator 210, a phase locked loop 220, and a local-oscillating signal generator 230. The voltage-controlled oscillator 210 generates an oscillating signal OSC in response to a control signal CTR.

A frequency tuning range of the voltage controlled oscillator 200 includes a first range from about 3680 MHz to about 3980 MHz corresponding to two times a PCS band (PCS band multiplied by 2), a second range from about 3328 MHz to about 3576 MHz corresponding to four times a cellular band (cellular band multiplied by 4), or a third range of about 3150.84 MHz corresponding to two times a GPS band (GPS band multiplied by 2). Consequently, the total frequency tuning range of the voltage controlled oscillator 200 is from about 3150.84 MHz to about 3980 MHz.

The local oscillating signal generator 230 divides a frequency of the oscillating signal OSC by 2 or 4 to generate a local-oscillating signal LO of wanted frequencies. The local oscillating signal generator 230 includes buffers 231, 232, and 236, frequency dividers 233 and 235, and a switching circuit 234. The buffers 231 and 232 buffer the oscillating signal OSC. For example, the buffer 231 buffers the oscillating signal OSC (about 3680 MHz through about 3980 MHz) when the local oscillator 200 is used for a PCS band signal, and the buffer 232 buffers the oscillating signal OSC (about 3150.84 MHz) when the local oscillator 200 is used for a GPS band signal.

The divider 233 divides a frequency of the oscillating signal OSC by 2. For example, the divider 233 divides the frequency of the oscillating signal (about 3328 MHz through about 3576 MHz) when the local oscillator 200 is used for a cellular band signal. In this manner, each of the buffer 231, the buffer 232, and the divider 233 outputs a respective frequency signal.

The switching circuit 234 selects one of the frequency signals from the buffer 231, the buffer 232, and the divider 233. The switching circuit 234 may be implemented with CMOS switches or multiplexers to select one of the frequency signals from the buffer 231, the buffer 232, and the divider 233 in response to a mode selection signal.

The divider 235 is coupled to the output of the switching circuit 234 to divide a frequency of the selected frequency signal from the switching circuit 234 to generate the local-oscillating signal LO. The buffer 236 is also coupled to the output of the switching circuit 234 to buffer the selected frequency signal from the switching circuit 234.

The phase locked loop 220 generates the control signal CTR based on a phase difference between the selected frequency signal and a reference signal (not shown) to decrease the phase difference. The reference signal may be generated by an external source or within the local oscillator 200.

If the voltage-controlled oscillator 210 generates the oscillating signal OSC of the PCS frequency band multiplied by 2, the buffer 231 and the divider 235 are used for generating the local-oscillating signal (about 1840 MHz through about 1990 MHz) from the oscillating signal OSC. On the other hand, if the voltage-controlled oscillator generates the oscillating signal OSC of the cellular frequency band multiplied by 4, the divider 233 and the divider 235 are used for generating the local-oscillating signal (about 832 MHz through about 894 MHz) from the oscillating signal OSC. Alternatively, if the voltage-controlled oscillator generates the oscillating signal of the GPS frequency band multiplied by 2, the buffer 232 and the divider 235 are used for generating the local-oscillating signal (about 1575.42 MHz) from the oscillating signal OSC.

Figure 3:
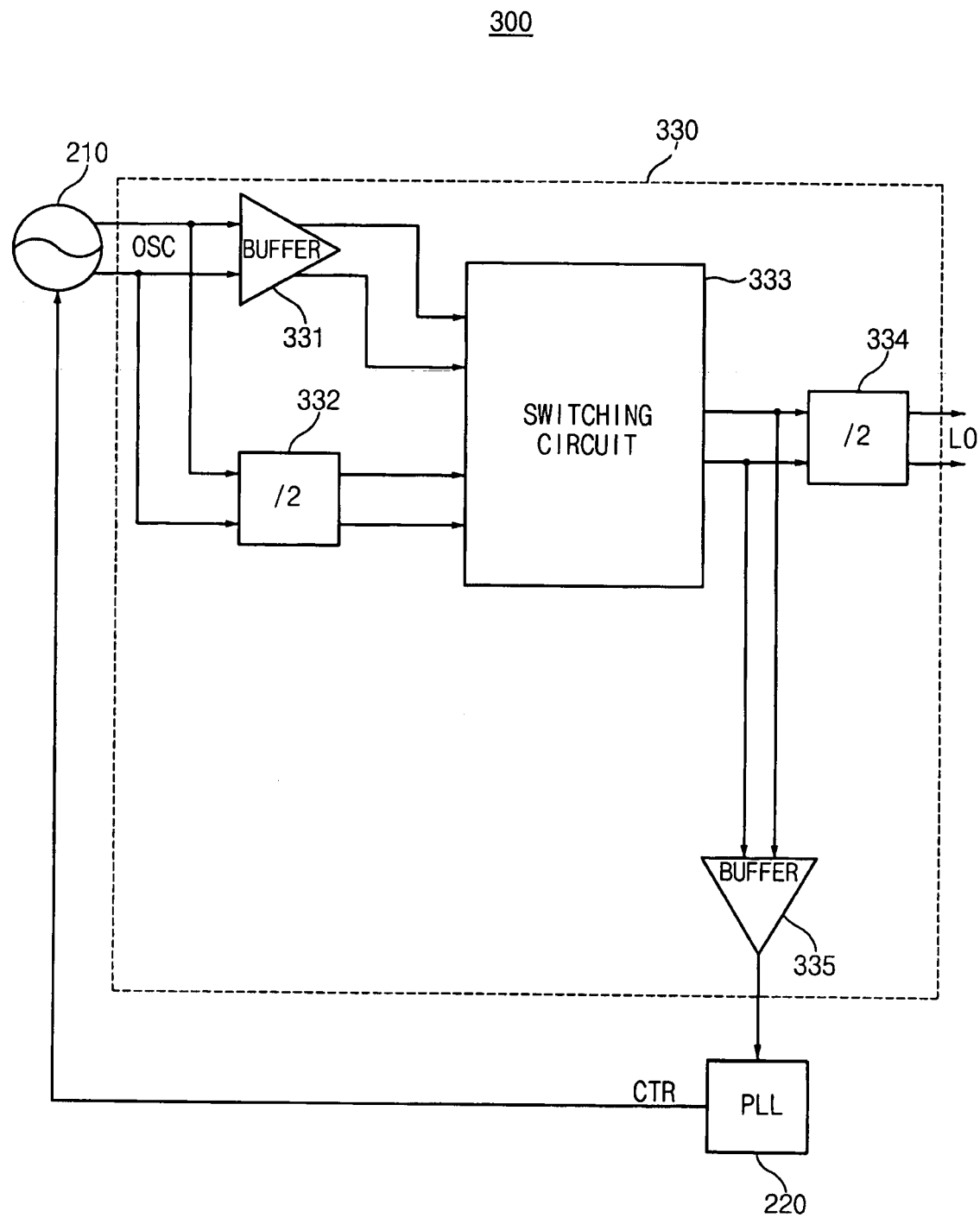
FIG. 3 is a block diagram of a local oscillator according to another embodiment of the present invention.

FIG. 3 is a block diagram of a local oscillator 300 according to another embodiment of the present invention. Referring to FIGS. 2 and 3, like reference numerals refer to similar elements, and a detailed description for such similar elements is omitted for FIG. 3.

In FIG. 3, the local oscillator 300 includes the voltage-controlled oscillator 210, the phase locked loop 220, and a local-oscillating signal generator 330. The local oscillating signal generator 330 divides a frequency of the oscillating signal OSC by 2 or 4 to generate a local-oscillating signal LO of wanted frequencies. The local oscillating signal generator 330 includes buffers 331 and 335, frequency dividers 332 and 334, and a switching circuit 333.

The buffer 331 buffers the oscillating signal OSC. For example, the buffer 331 buffers the oscillating signal OSC (about 3680 MHz through about 3980 MHz) when the local oscillator 300 is used for a PCS band signal. In addition, the buffer 331 also buffers the oscillating signal OSC (about 3150.84 MHz) when the local oscillator 300 is used for a GPS band signal.

The divider 332 divides a frequency of the oscillating signal OSC by 2. For example, the divider 332 divides the frequency of the oscillating signal (about 3328 MHz through about 3576 MHz) when the local oscillator 300 is used for a cellular band signal.

In this manner, each of the buffer 331 and the divider 332 outputs a respective frequency signal. The switching circuit 333 selects one of the frequency signals from the buffer 331 and the divider 332. The switching circuit 333 may be implemented with CMOS switches or multiplexers to select one of the frequency signals from the buffer 331 and the divider 332 in response to a mode selection signal.

The divider 334 is coupled to the output of the switching circuit 333 to divide a frequency of the selected frequency signal from the switching circuit 333 to generate the local-oscillating signal LO. The buffer 335 is also coupled to the output of the switching circuit 333 to buffer the selected frequency signal from the switching circuit 333.

The phase locked loop 220 generates the control signal CTR based on a phase difference between the selected frequency signal and a reference signal (not shown) to decrease the phase difference. The reference signal may be generated by an external source or within the local oscillator 300.

If the voltage-controlled oscillator 210 in FIG. 3 generates the oscillating signal of the PCS frequency band multiplied by 2, the buffer 331 and the divider 334 are used for generating the local-oscillating signal (about 1840 MHz through about 1990 MHz) from the oscillating signal OSC. On the other hand, if the voltage-controlled oscillator 210 in FIG. 3 generates the oscillating signal of the cellular frequency band multiplied by 4, the divider 332 and the divider 334 are used for generating the local-oscillating signal (about 832 MHz through about 894 MHz) from the oscillating signal OSC. Alternatively, if the voltage-controlled oscillator 210 in FIG. 3 generates the oscillating signal of the GPS frequency band multiplied by 2, the buffer 331 and the divider 334 are used for generating the local-oscillating signal (about 1575.42 MHz) from the oscillating signal OSC.

Figure 4:
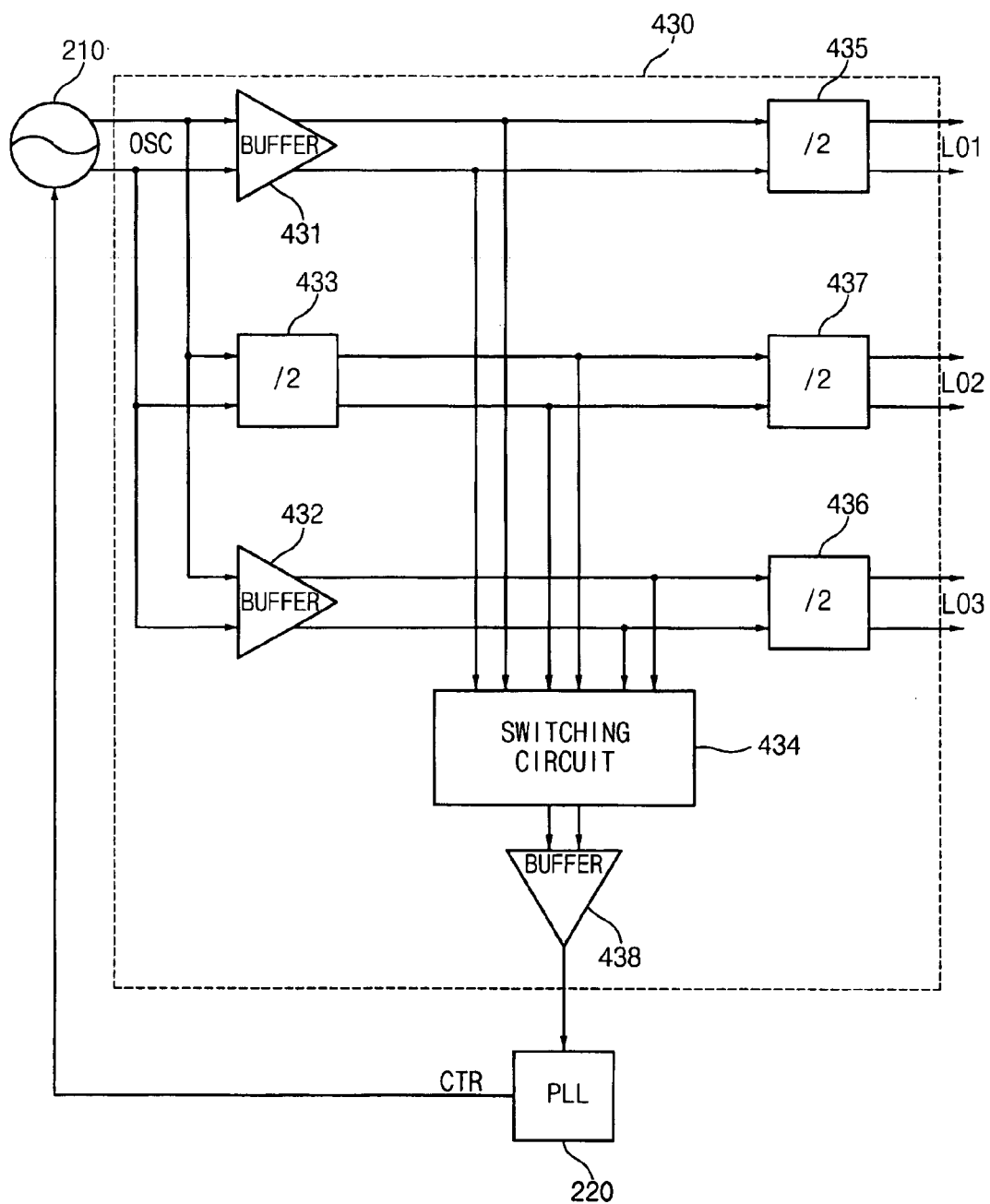
FIG. 4 is a block diagram of a local oscillator according to a further embodiment of the present invention.

FIG. 4 is a block diagram of a local oscillator 400 in accordance with a further embodiment of the present invention. Referring to FIGS. 2 and 4, like reference numerals refer to similar elements, and a detailed description for such similar elements is omitted for FIG. 4.

In FIG. 4, the local oscillator 400 includes the voltage-controlled oscillator 210, the phase locked loop 220, and a local-oscillating signal generator 430. The local oscillating signal generator 430 divides a frequency of the oscillating signal OSC by 2 or 4 to generate local-oscillating signals LO1, LO2 and LO3 of wanted frequencies. The local oscillating signal generator 430 includes buffers 431, 432, and 438, frequency dividers 433, 435, 436, and 437, and a switching circuit 434.

The buffer 431 buffers the oscillating signal OSC. For example, the buffer 431 buffers the oscillating signal OSC (about 3680 MHz through about 3980 MHz) when the local oscillator 400 is used for a PCS band signal. In addition, the buffer 432 buffers the oscillating signal OSC (about 3150.84 MHz) when the local oscillator 400 is used for a GPS band signal.

The divider 433 divides a frequency of the oscillating signal OSC by 2. For example, the divider 433 divides the frequency of the oscillating signal (about 3328 MHz through about 3576 MHz) when the local oscillator 400 is used for a cellular band signal.

In this manner, each of the buffers 431 and 432 and the divider 433 outputs a respective frequency signal. The switching circuit 434 selects one of the frequency signals from the buffers 431 and 432 and the divider 433. The switching circuit 434 may be implemented with CMOS switches or multiplexers to select one of the frequency signals from the buffers 431 and 432 and the divider 433 in response to a mode selection signal.

The divider 435 divides a frequency of the frequency signal from the buffer 431 to generate the local oscillating signal LO1. The divider 436 divides a frequency of the frequency signal from the buffer 432 to generate the local oscillating signal LO3. The divider 437 divides a frequency of the frequency signal from the divider 433 to generate the local-oscillating signal LO2.

The buffer 438 is coupled to the output of the switching circuit 434 to buffer the selected frequency signal from the switching circuit 434. The phase locked loop 220 generates the control signal CTR based on a phase difference between the selected frequency signal and a reference signal (not shown) to decrease the phase difference. The reference signal may be generated by an external source or within the local oscillator 400.

If the voltage-controlled oscillator 210 in FIG. 4 generates the oscillating signal of the PCS frequency band multiplied by 2, the buffer 431 and the divider 435 are used for generating the local-oscillating signal LO1 (about 1840 MHz through about 1990 MHz) from the oscillating signal OSC. On the other hand, if the voltage-controlled oscillator generates the oscillating signal of the cellular frequency band multiplied by 4, the divider 433 and the divider 437 are used for generating the local-oscillating signal LO2 (about 832 MHz through about 894 MHz) from the oscillating signal OSC. Alternatively, if the voltage-controlled oscillator generates the oscillating signal of the GPS frequency band multiplied by 2, the buffer 432 and the divider 436 are used for generating the local-oscillating signal LO3 (about 1575.42 MHz) from the oscillating signal OSC.

In this manner, the local oscillators of FIGS. 2, 3, and 4 use buffers and dividers to generate the local-oscillating signals using just one voltage-controlled oscillator 210 for reduced chip size, power consumption, product price, and noise.

Figure 5:
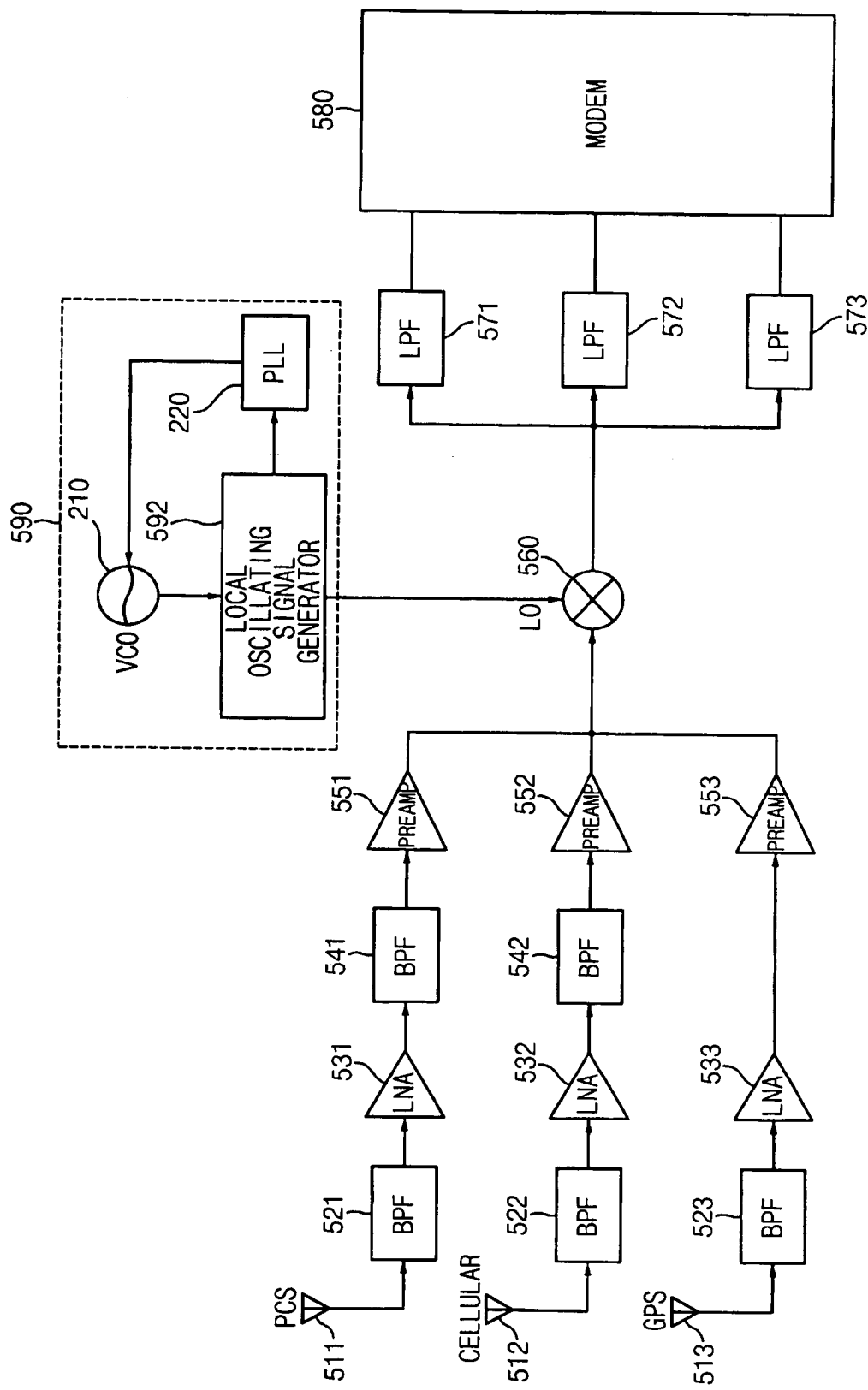
FIG. 5 is a block diagram of a multi-band wireless communication system according to an embodiment of the present invention.

FIG. 5 shows a block diagram of a multi-band wireless communication system according to an embodiment of the present invention. Referring to FIG. 5, the multi-band wireless communication system includes antennas 511, 512, and 513, band pass filters 521, 522, 523, 541, and 542, LNAs (low noise amplifiers) 531, 532 and 533, pre-amplifiers 551, 552 and 553, a mixer 560, a local oscillator 590, low pass filters 571, 572, and 573, and a modem 580.

The antennas 511, 512, and 513 receive a PCS band signal, a cellular band signal, and a GPS band signal, respectively. The band pass filters 521, 522, and 523 filter the PCS band signal, the cellular band signal, and the GPS band signal, respectively. The LNAs 531, 532, and 533 amplify output signals of the band pass filters 521, 522, and 523, respectively. The band pass filters 541 and 542 filter output signals of the LNAs 531 and 532, respectively. The pre-amplifiers 551 and 552 amplify output signals of the band pass filters 541 and 542, respectively. The pre-amplifier 553 amplifies the output signal of the LNA 533.

The local oscillator 590 generates a local oscillating signal LO for the PCS band, the cellular band, or the GPS band. The local oscillator 590 includes only one voltage-controlled oscillator 210, a phase locked loop 220, and a simple local oscillating signal generator 592. For example, the local oscillator 590 is implemented as the local oscillator 200 of FIG. 2 or the local oscillator 300 of FIG. 3, and the local oscillating signal generator 592 is implemented as the local oscillating signal generator 230 of FIG. 2 or the local oscillating signal generator 330 of FIG. 3. Thus, the multi-band wireless communication system is capable of processing the PCS band, the cellular band, and the GPS band without a plurality of voltage-controlled oscillators and without a complex local oscillating signal generator.

The mixer 560 mixes one of the output signals from the pre-amplifiers 551, 552, and 553 with the local-oscillating signal LO to generate a PCS 0-IF signal, a cellular 0-IF signal, or a GPS 0-IF signal. The low pass filters 571, 572, and 573 filter the PCS 0-IF signal, the cellular 0-IF signal, and the GPS 0-IF signal, respectively. The modem 580 modulates or demodulates output signals of the low pass filters 571, 572, and 573.

Figure 6:
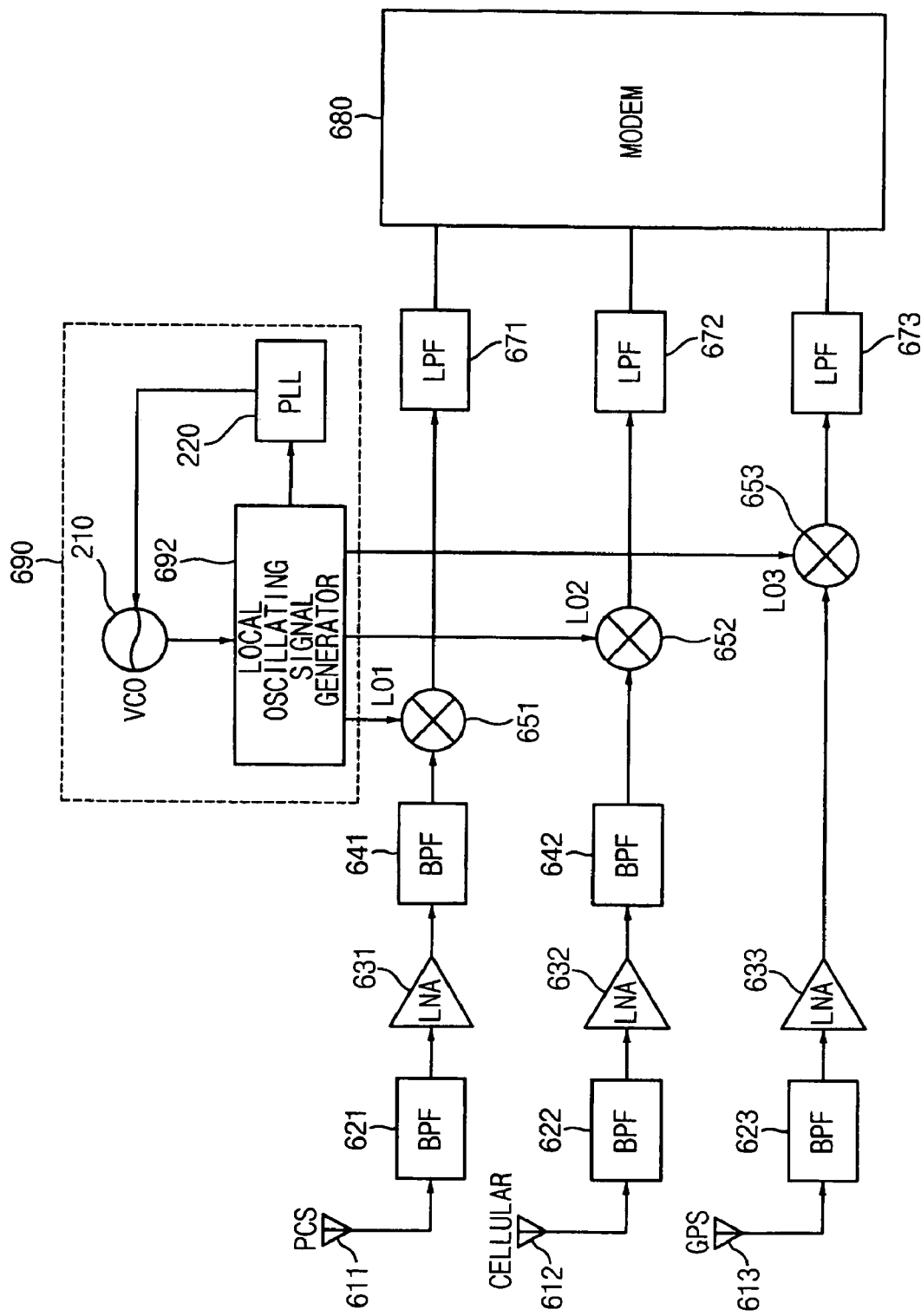
FIG. 6 is a block diagram of a multi-band wireless communication system according to another embodiment of the present invention.

FIG. 6 shows a block diagram of a multi-band wireless communication system according to another embodiment of the present invention. Referring to FIG. 6, the multi-band wireless communication system includes antennas 611, 612, and 613, band pass filters 621, 622, 623, 641, and 642, LNAs 631, 632, and 633, mixers 651, 652, and 653, a local oscillator 690, low pass filters 671, 672, and 673, and a modem 680.

The antennas 611, 612, and 613, the band pass filters 621, 622, 623, 641, and 642, the LNAs 631, 632, and 633, the low pass filters 671, 672, and 673, and the modem 680 operate similarly to the antennas 511, 512, and 513, the band pass filters 521, 522, 523, 541, and 542, the LNAs 531, 532, and 533, the low pass filters 571, 572, and 573, and the modem 580 of FIG. 5.

The antennas 611, 612, and 613 receive a PCS band signal, a cellular band signal, and a GPS band signal, respectively. The band pass filters 621, 622, and 623 filter the PCS band signal, the cellular band signal, and the GPS band signal, respectively. The LNAs 631, 632 and 633 amplify output signals of the band pass filters 621, 622, and 623, respectively. The band pass filters 641 and 642 filter the output signals of the LNAs 631 and 632, respectively.

The local oscillator 690 generates local oscillating signals LO1, LO2, and LO3 for the PCS band, the cellular band, and the GPS band, respectively. The local oscillator 690 includes only one voltage-controlled oscillator 210, a phase locked loop 220, and a simple local oscillating signal generator 692. For example, the local oscillator 690 may be implemented as the local oscillator 400 of FIG. 4, and the local oscillating signal generator 692 may be implemented as the local oscillating signal generator 430 of FIG. 4. Thus, the multi-band wireless communication system of FIG. 6 is capable of processing the PCS band, the cellular band, and the GPS band without a plurality of voltage-controlled oscillators and without a complex local oscillating signal generator.

The mixers 651, 652, and 653 mix output signals of the band pass filters 641 and 642 and the LNA 633, respectively, with the local-oscillating signals LO1, LO2, and LO3, respectively, to generate a PCS 0-IF signal, a cellular 0-IF signal, and a GPS 0-IF signal, respectively. The low pass filters 671, 672, and 673 filter the PCS 0-IF signal, the cellular 0-IF signal, and the GPS 0-IF signal, respectively. The modem 680 modulates or demodulates output signals of the low pass filters 671, 672, and 673.

The local oscillators in FIGS. 2, 3, and 4 have just one voltage controlled oscillator and a simple local oscillating signal generator for reduced chip size and power consumption. Also, a LC tank of the voltage-controlled oscillator may have a high quality factor for a high frequency voltage-controlled oscillator for an improved noise characteristic. Moreover, the local oscillators generate the local-oscillating signals via more than one divider so that the local oscillators generate I/Q (in-phase/quadrature) signals easily. Furthermore, the local oscillators have decreased noise floor and spurious frequencies because of the simple local oscillating signal generator.

While the exemplary embodiment of the present invention and their advantages have been described in detail, it should be understood that various changes, substitutions, and alterations may be made herein without departing from the scope of the invention.

What is claimed is:
1. A local oscillator comprising:
 a voltage-controlled oscillator that generates an oscillating signal in response to a control signal;
 a local oscillating signal generator including at least one buffer and at least one frequency divider for generating from the oscillating signal a plurality of frequency signals having different frequencies, and including a switching circuit that selects one of the plurality of frequency signals, wherein each of the at least one buffer and the at least one frequency divider receives the oscillating signal directly from the voltage-controlled oscillator; and
 a phase locked loop that generates the control signal from the selected frequency signal.

2. The local oscillator of claim 1, wherein the local oscillating signal generator outputs a local-oscillating signal generated from the selected frequency signal.

3. A local oscillator comprising:
 a voltage-controlled oscillator that generates an oscillating signal in response to a control signal;
 a local oscillating signal generator including at least one buffer and at least one frequency divider for generating from the oscillating signal a plurality of frequency signals having different frequencies, and including a switching circuit that selects one of the plurality of frequency signals; and
 a phase locked loop that generates the control signal from the selected frequency signal
 wherein the local oscillating signal generator outputs a local-oscillating signal generated from the selected frequency signal, and wherein the local oscillating signal generator further includes:
 another frequency divider coupled to an output of the switching circuit to generate the local-oscillating signal from the selected frequency signal.

4. The local oscillator of claim 1, wherein the local oscillating signal generator generates a respective local-oscillating signal from each of the plurality of frequency signals.

5. The local oscillator of claim 4, wherein the local oscillating signal generator further includes:
 a respective frequency divider for receiving a corresponding one of the frequency signals to generate the respective local-oscillating signal.

6. The local oscillator of claim 1, wherein the frequency signal selected by the switching circuit depends on a tuned frequency range of the voltage-controlled oscillator.

7. The local oscillator of claim 1, wherein the local oscillating signal generator further includes:
a buffer disposed between an output of the switching circuit and the phase locked loop.

8. A multi-band wireless communication system comprising:
an antenna for receiving a frequency band signal having a frequency range;
a local oscillator comprising:
a voltage-controlled oscillator that generates an oscillating signal in response to a control signal;
a local oscillating signal generator including at least one buffer and at least one frequency divider for generating from the oscillating signal a plurality of frequency signals having different frequencies, and including a switching circuit that selects one of the plurality of frequency signals, wherein each of the at least one buffer and the at least one frequency divider receives the oscillating signal directly from the voltage-controlled oscillator; and
a phase locked loop that generates the control signal from the selected frequency signal; and
a mixer for mixing the frequency band signal and a local oscillating signal generated by the local oscillator from the plurality of frequency signals.

9. The multi-band wireless communication system of claim 8, wherein the local oscillator generates the local-oscillating signal from the selected frequency signal.

10. A multi-band wireless communication system comprising:
an antenna for receiving a frequency band signal having a frequency range;
a local oscillator comprising:
a voltage-controlled oscillator that generates an oscillating signal in response to a control signal;
a local oscillating signal generator including at least one buffer and at least one frequency divider for generating from the oscillating signal a plurality of frequency signals having different frequencies, and including a switching circuit that selects one of the plurality of frequency signals; and
a phase locked loop that generates the control signal from the selected frequency signal; and
a mixer for mixing the frequency band signal and a local oscillating signal generated by the local oscillator from the plurality of frequency signals;
wherein the local oscillator generates the local-oscillating signal from the selected frequency signal, and wherein the local oscillating signal generator further includes:
another frequency divider coupled to an output of the switching circuit to generate the local-oscillating signal from the selected frequency signal.

11. The multi-band wireless communication system of claim 8, further comprising:
a plurality of antennas, each antenna receiving a respective frequency band signal having a respective frequency range;
wherein the local oscillator generates a respective local-oscillating signal from each of the plurality of frequency signals; and
a plurality of mixers, each mixer mixing a respective frequency band signal from an antenna and a respective local oscillating signal from the local oscillator.

12. The multi-band wireless communication system of claim 11, wherein the local oscillating signal generator further includes:
a respective frequency divider for receiving a corresponding one of the frequency signals to generate the respective local-oscillating signal.

13. The multi-band wireless communication system of claim 8, wherein the frequency signal selected by the switching circuit depends on the frequency range of the frequency band signal.

14. The multi-band wireless communication system of claim 8, wherein the local oscillating signal generator further includes:
a buffer disposed between the output of the switching circuit and the phase locked loop.

15. A method for generating a local-oscillating signal, comprising:
generating an oscillating signal in response to a control signal at a voltage-controlled oscillator;
generating from the oscillating signal a plurality of frequency signals having different frequencies from at least one buffer and at least one frequency divider, wherein each of the at least one buffer and the at least one frequency divider receives the oscillating signal directly from the voltage-controlled oscillator;
selecting one of the plurality of frequency signals; and
generating the control signal from the selected frequency signal and a reference signal.

16. The method of claim 15, further comprising:
generating a local-oscillating signal from the selected frequency signal.

17. The method of claim 16, further comprising:
generating the local-oscillating signal by frequency division of the selected frequency signal.

18. The method of claim 15, further comprising:
generating a respective local-oscillating signal from each of the plurality of frequency signals.

19. The method of claim 18, further comprising:
generating the respective local-oscillating signal by frequency division of each of the plurality of frequency signals.

20. The method of claim 15, wherein the selected frequency signal depends on a tuned frequency range of the voltage-controlled oscillator.

* * * * *